United States Patent

Greinke et al.

Patent Number: 5,677,082
Date of Patent: Oct. 14, 1997

[54] COMPACTED CARBON FOR ELECTROCHEMICAL CELLS

[75] Inventors: Ronald Alfred Greinke, Medina; Irwin Charles Lewis, Strongsville, both of Ohio

[73] Assignee: UCAR Carbon Technology Corporation, Danbury, Conn.

[21] Appl. No.: 654,644

[22] Filed: May 29, 1996

[51] Int. Cl.$^6$ .............................. H01M 10/40; C01B 31/02
[52] U.S. Cl. ........................ 429/194; 429/218; 429/232; 423/445 R; 423/448
[58] Field of Search .............................. 429/194, 196, 429/197, 218, 232, 224; 423/448, 445 R, 449.1; 252/502

[56] References Cited

U.S. PATENT DOCUMENTS

| | | | |
|---|---|---|---|
| 4,205,055 | 5/1980 | Maire et al. | 423/445 |
| 4,235,859 | 11/1980 | Borkowski et al. | 423/448 |
| 4,289,604 | 9/1981 | Kolling et al. | 423/445 X |
| 4,702,977 | 10/1987 | Hiratsuka et al. | 429/218 X |
| 5,340,620 | 8/1994 | Takami et al. | 429/194 |
| 5,344,724 | 9/1994 | Ozaki et al. | 429/94 |

FOREIGN PATENT DOCUMENTS

| | | |
|---|---|---|
| 0474183A2 | 9/1991 | European Pat. Off. . |
| 1-204361 | 8/1989 | Japan . |

OTHER PUBLICATIONS

Chemistry and Physics of Carbon, W. Ruland, vol. 4, (P.L. Walker, Jr., ed), Marcel Dekker, New York, N.Y., 1968, pp. 1–83 (Ruland II).
Processing and Characterization of Carbon Electrodes for Li Ion Batteries, by X. Chu et al, The Electrochemical Society Proceedings, vol. 94–28, pp. 196–201 (Chu et al). (No Date).
Aspects of Carbon Materials as Negative Electrodes for Lithium Secondary Batteries, by Kuniaki Tatsumi et al, Osaka Kogyo Gijutsu Shikensho Kiho (No Date).
Bulletin of the Govern. Ind. res. Instit., Osaka, 42(3), 150 1991. (Tatsumi et al) (No Month).
Technological Advances, 1993 Elsevier Science Publishing Co., Inc.
Porosity in Carbons and Graphites, by B. McEnaney et al, Introduction to Carbon Science, (McEnaney et al). No Date.
Electrodic Characteristics of Various Carbon Materials for Lithium Rechargeable Batteries, by T. Iijima et al, Synethetic Metals, pp. 9–20 (Iijima et al). (No Date).

(List continued on next page.)

Primary Examiner—Anthony Skapars
Attorney, Agent, or Firm—Frederick J. McCarthy

[57] ABSTRACT

This invention provides compacted carbon that is useful in the electrode of an alkali metal/carbon electrochemical cell of improved capacity selected from the group consisting of:
(a) coke having the following properties:
  (i) an x-ray density of at least 2.00 grams per cubic centimeters,
  (ii) a closed porosity of no greater than 5%, and
  (iii) an open porosity of no greater than 47%; and
(b) graphite having the following properties:
  (i) an x-ray density of at least 2.20 grams per cubic centimeters,
  (ii) a closed porosity of no greater than 5%, and
  (iii) an open porosity of no greater than 25%.

This invention also relates to an electrode for an alkali metal/carbon electrochemical cell comprising compacted carbon as described above and a binder.

This invention further provides an alkali metal/carbon electrochemical cell comprising:
(a) an electrode as described above,
(b) a non-aqueous electrolytic solution comprising an organic aprotic solvent and an electrolytically conductive salt and an alkali metal, and
(c) a counterelectrode.

20 Claims, 7 Drawing Sheets

OTHER PUBLICATIONS

C. C. Furnas, Industrial and Engineering Chemistry 23, 1052 (1931) (Furnas) (Month Not Available).

K. Brandt, Solid State Ionics 69, 173 (1994) (Brandt) (Month not Available).

J. R. Dahn et al in "Lithium Batteries," vol. 5, p. 34 1994 (Dahn et al) (Month not Available).

W. Ruland, Carbon 2, 365 1965 (Ruland) (Month not Available).

"Heat Transfer Phenomena in Lithium/Polymer–Electrolyte Batteries for Electric Vehicle Application," by Yufei Chen and James W. Evans, J. Electrochem. Soc., vol. 140, No. 7, Jul. 1993, 1883–1838.

400x Optical

1000x SEM

Fig. 4(c)

3000x SEM

Fig. 4(d)

3000x SEM

Fig. 6

COMPACTED CARBON FOR ELECTROCHEMICAL CELLS

GOVERNMENT CONTRACT

The work described and claimed in this patent application was conducted under Cooperative Agreement No. DE-FC02-91CE50336 with the Department of Energy of the United States of America.

BACKGROUND OF THE INVENTION

1. Field of the Invention

This invention relates to the field of electrochemical cells, and in particular to the field of carbon-containing electrodes for such electrochemical cells.

2. Description of the Related Art

In recent years, numerous proposals have been made for increasing the energy densities of electrochemical cells through the use of alkali metals as anodic materials in combination with a form of carbon (e.g., coke or graphite). Lithium metal has received the most attention in this regard due to its very low atomic weight and its being the most electronegative of all the metals. Electrochemical cells containing lithium or other alkali metal anodes cannot employ aqueous or any other active hydrogen-containing electrolytes (i.e., protic electrolytes) since contact of these metals with such electrolytes would result in a reaction with the evolution of hydrogen gas. Accordingly, electrochemical cells of this type which are intended for service at ambient temperatures are provided with non-aqueous electrolytic solutions in which electrically conductive salts are dissolved in organic aprotic solvents. Among the numerous electrically conductive salts which have heretofore been employed in non-aqueous electrolytic solutions are the alkali metal salts (especially lithium salts) of such anions as the halides, halates, perhalates, haloaluminates, haloarsenates, halophosphates, haloacetates, phosphates, thiocyanates, sulfides, sulfates, cyanides, pierates, acetylacetonates, fluoroborates, hydrides, borohydrides, and so forth. These and other electrically conductive salts have been dissolved in a wide variety of organic aprotic solvents including Lewis bases such as the tertiary amines; amides and substituted amides such as formamide; nitriles such as acetonitrile, propionitrile and benzonitrile; open chain and cyclic esters such as propylene carbonate, alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran.

For use in many applications (such as in electric powered vehicles), the size of the electrochemical cell is critical and it is desired to maximize the deliverable energy ("capacity") of the cell. The extensive literature on lithium/carbon electrochemical cells has focused on achieving the best capacity or energy performance based on the weight of the carbon in the anode (i.e., on a weight basis). The theoretical capacity attainable for lithium/carbon anodes is usually equated to 372 milliamperehours per gram (mAh/g) of carbon. This capacity is achieved when each lithium atom is associated with six carbon atoms in the crystalline structure of the carbon (referred to as "$LiC_6$ intercalation").

Thus previous efforts have been directed toward identifying the type of carbon which would achieve the maximum degree of incorporation of the lithium into the crystalline structure of the carbon ($LiC_6$ intercalation) and so achieve a capacity as close to 372 mAh/g as possible. Graphite materials (such as natural graphite) have been used frequently since they can achieve $LiC_6$ intercalation. However, graphites generally show a high reactivity with a number of electrolyte solvents (such as propylene carbonate) used in electrochemical cells. Cokes and other carbon materials which have been processed to lower than graphitization temperatures are much more stable with respect to electrolyte solvents but give lower electrical capacities. It has therefore been important to search for carbon materials which would have the highest capacity on a weight basis and yet remain stable to electrolytes.

The literature has not disclosed or suggested increasing the capacity of lithium/carbon electrochemical cell by optimizing the weight of the carbon on a per volume basis (i.e., on a density basis).

SUMMARY OF THE INVENTION

This invention provides compacted carbon that is useful in the electrode of an alkali metal/carbon electrochemical cell of improved capacity selected from the group consisting of:

(a) coke having the following properties:
  (i) an x-ray density of at least 2.00 grams per cubic centimeters,
  (ii) a closed porosity of no greater than 5%, and
  (iii) an open porosity of no greater than 47%; and (b) graphite having the following properties:
  (i) an x-ray density of at least 2.20 grams per cubic centimeters,
  (ii) a closed porosity of no greater than 5%, and
  (iii) an open porosity of no greater than 25%.

This invention also provides an electrode for an alkali metal/carbon electrochemical cell comprising compacted carbon as described above and a binder.

This invention further provides an alkali metal/carbon electrochemical cell comprising:

(a) an anode as described above, (b) a non-aqueous electrolytic solution comprising an organic aprotic solvent and an electrolytically conductive salt of an alkali metal, and (c) a cathode.

DETAILED DESCRIPTION OF THE INVENTION

Compacted Carbon

Density and Porosity: General

The carbon starting materials used in the anodes of electrochemical cells contain voids or pores which either result from the manufacturing process or are inherent in the microstructure of the raw materials. After manufacture, initial voids may be developed or new voids created as a result of mechanical, chemical or heat treatments.

The classification of porosity is based on the terms "void" and "pore." A void is an empty space which in solid materials occurs where there is a discontinuity in the array of atoms and molecules, i.e., where their electron density falls to zero. Small angle X-ray scattering due to the electron density transition at the solid-void interface may be used to obtain parameters of the voidage (see the main section on small angle X-ray scattering). In this sense, a pore is a class of void which is connected to the external surface of a solid and will allow the passage of fluids into, out of, or through a material. In the scientific literature on porous solids the terms "open pore" and "closed pore" are used, the former denoting a pore which is connected to the external surface of the solid and the latter denoting a void which is not so connected. To conform with general usage, the terms "open pore" and "closed pore" will be employed herein.

Porous carbon starting materials used in the anodes of electrochemical cells may be consolidated or unconsolidated. A bed of activated carbon granules is an example of an unconsolidated porous medium. The pore structure comprises the intraparticulate voidage, i.e., the inherent porosity of the particles, and the interparticulate voids, i.e., the spaces between the granules. In contrast, in consolidated materials, e.g., engineering graphites, the solid is a continuous structure within which there is a network of pores of different sizes and shapes, as well as isolated pores. Transport pores are those pores in which a concentration gradient exists during steady state or time-independent fluid flow through the material. Blind pores are connected to transport pores by a single opening so that in them concentration gradients and hence fluid flow only occur during unsteady state or time-dependent flow.

The shapes of pores in carbon starting materials vary from slit-shaped cracks to spheroidal bubbles. Cracks may follow tortuous paths through the solid and may be connected to other pores to form an extensive and irregular network. The shapes of pores can have important effects on some properties of the carbon starting materials, e.g., mechanical strength and thermal expansivity, but the characterization and classification of pores by shape is much less advanced than classification by size. Also network effects arising from the connectivity of pores are important in some situations, e.g., the interpretation of adsorption hysteresis and percolation of fluids, but are often neglected in standard treatments of porosity (see the section on mesoporous carbons). Such carbon porosity results in carbon anodes having less than the optimum deliverable energy in terms of the volume of the anode.

In accordance with the present invention, the electrochemical volume capacity of carbon can be improved and "compacted carbon" can be achieved in three ways: (1) by increasing the carbon x-ray density of individual carbon particles (herein referred to as "x-ray density") with maximum carbon x-ray density of 2.265 grams per cubic centimeter (g/cc) being achievable for perfect crystalline graphite; (2) by reducing the mount of porosity within the individual carbon particles (herein referred to as "closed porosity"); and (3) by increasing the packing density and reducing interparticle porosity of a mass of carbon particles (herein referred to as "open porosity"). The maximum attainable capacity of a perfect graphite on a per volume (cubic centimeter) basis, assuming no open or closed porosity is 2.265 g/cc×372 mAh/g=843 mAh/cc. The concepts for maximizing the volume capacity for these three parameters to produce compacted carbon in accordance with the present invention are discussed in additional detail below.

In view of the fact that coke is less compressible ("harder") than graphite, the minimum x-ray density of the compacted coke of the present invention is lower and the maximum open porosity of the coke is higher than the corresponding values for the compacted graphite of the present invention.

X-ray Density

In accordance with the present invention, the x-ray density of the individual carbon particles to be used in an electrode is increased by utilizing highly graphitizing carbon starting materials which develop planar hexagonal networks on carbonization and then processing these carbons to the highest temperature possible. To achieve maximum x-ray (or "skeletal") density, these carbon starting materials are heated from 2000° C. to 3000° C. (preferably to about 2500° C.). Such highly graphitizing carbon starting materials are preferred in the present invention and include petroleum coke, polynuclear aromatic hydrocarbons and petroleum pitch. Since the x-ray density is relatively low in carbons derived from nongraphitizing carbon starting materials (such as thermoset resins, polyacrylonitrile and polyphenylenes) even when heated to the highest temperatures, such carbon starting materials are not preferred in the practice of the present invention.

The x-ray density of an electrode carbon is measured using the following equation:

$$\text{x-ray density} = 2.265 \ (3.354 \ \text{Å}/C_o)$$

where:

2.265 is the density of perfect single crystal graphite in grams per cubic centimeter, 3.354 Å is the interlayer spacing between the graphene planes of perfect graphite, and $C_o$ is the interlayer spacing of a selected electrode carbon in angstroms (Å).

For example, the interlayer spacing of a coke material is 3.47 Å which would result in an x-ray density of 2.19 grams per cubic centimeter. In this case, the reduction from the optimum x-ray density of perfect graphite is only 4%. In another example, the interlayer spacing of a PAN (polyacrylonitrile) carbon is 3.70 Å. which would result in an x-ray density of 2.05 grams per cubic centimeter, a 10% reduction from the optimum skeletal density.

Closed Porosity

Figure 3A:
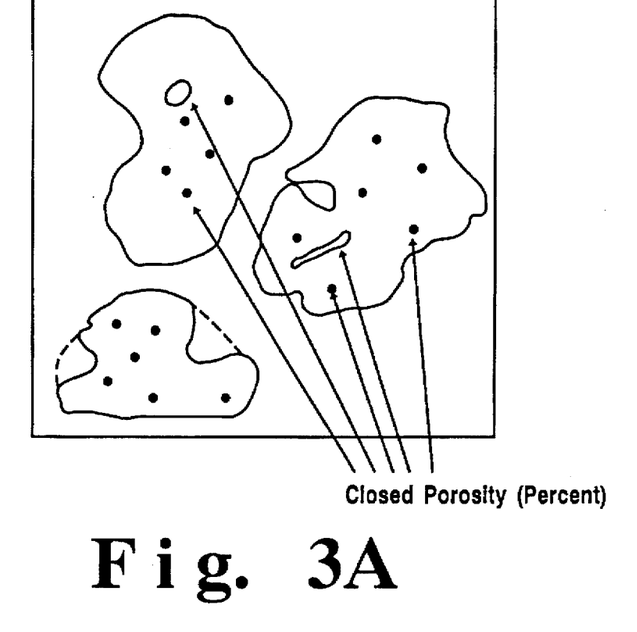
FIGS. 3(a)–3(b) shows the open and closed porosity of a carbon starting material useful in producing an anode of an electrochemical cell of the present invention.
Figure 3B:
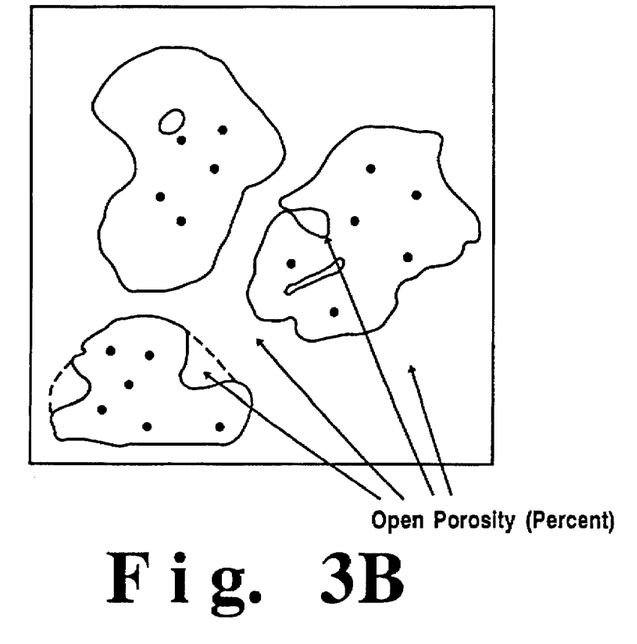
Figure 4A:
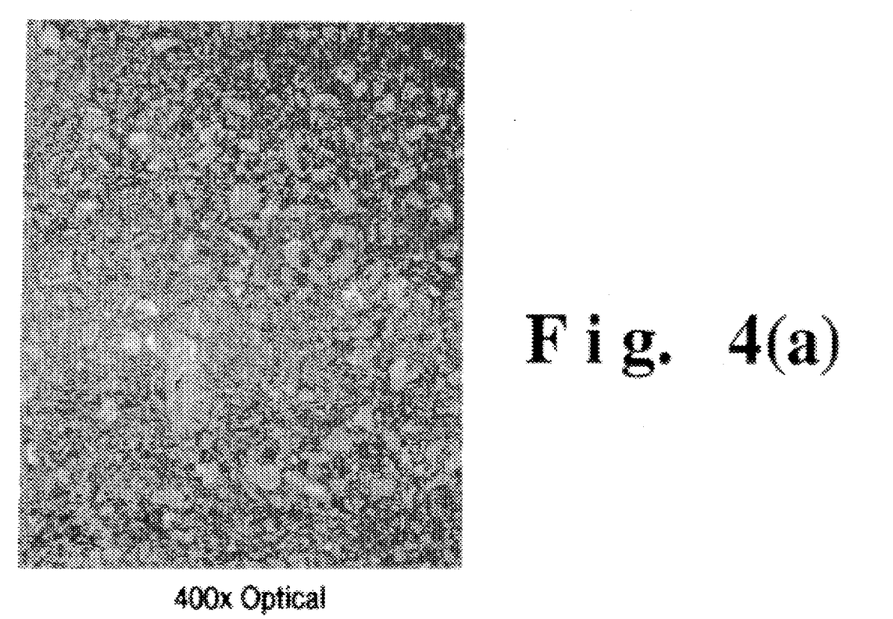
FIGS. 4(a)–4(d) are optical and scanning electron micrographs showing the packing and interparticle porosity achieved with coke and an EPDT binder in accordance with the present invention.
Figure 4B:
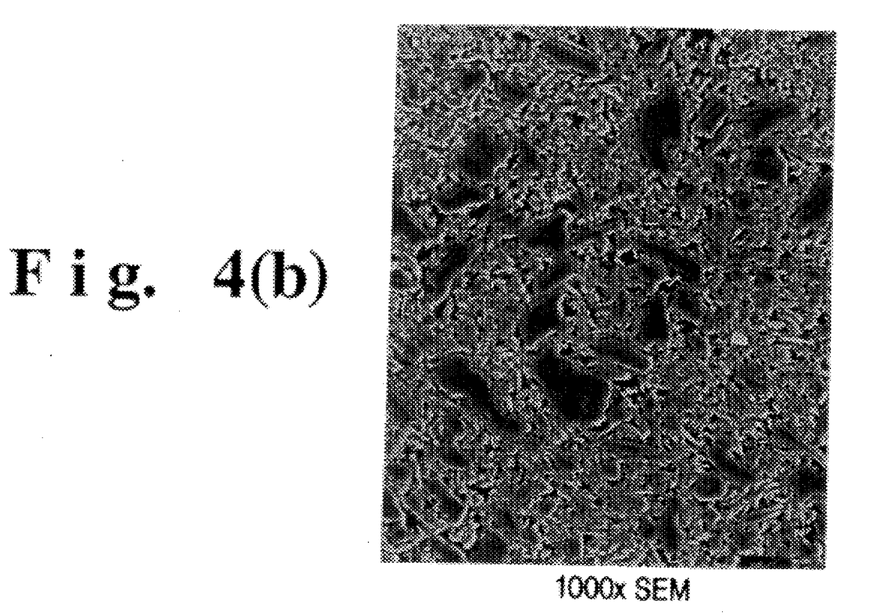
Figure 4C:
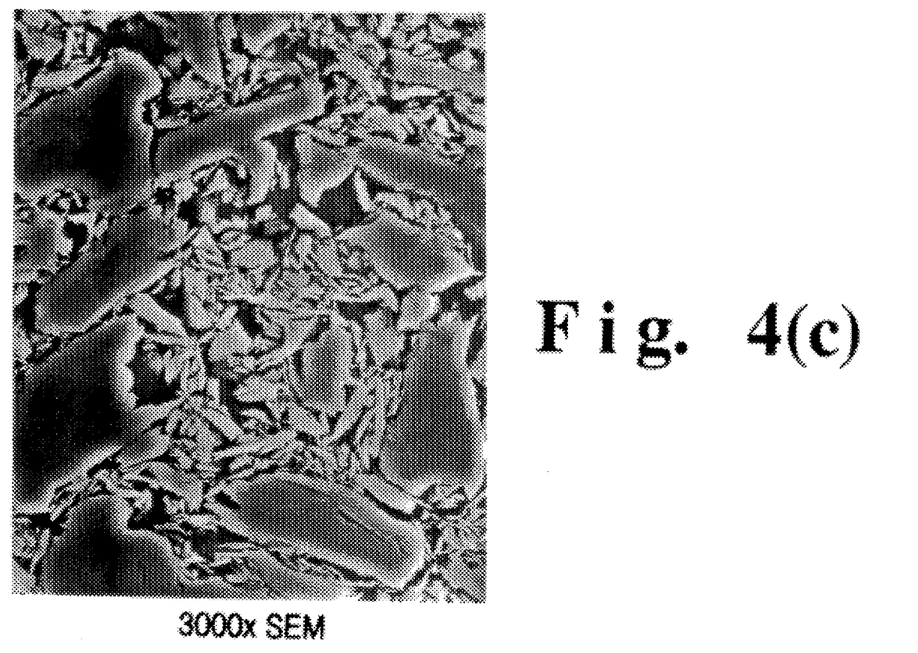
Figure 4D:
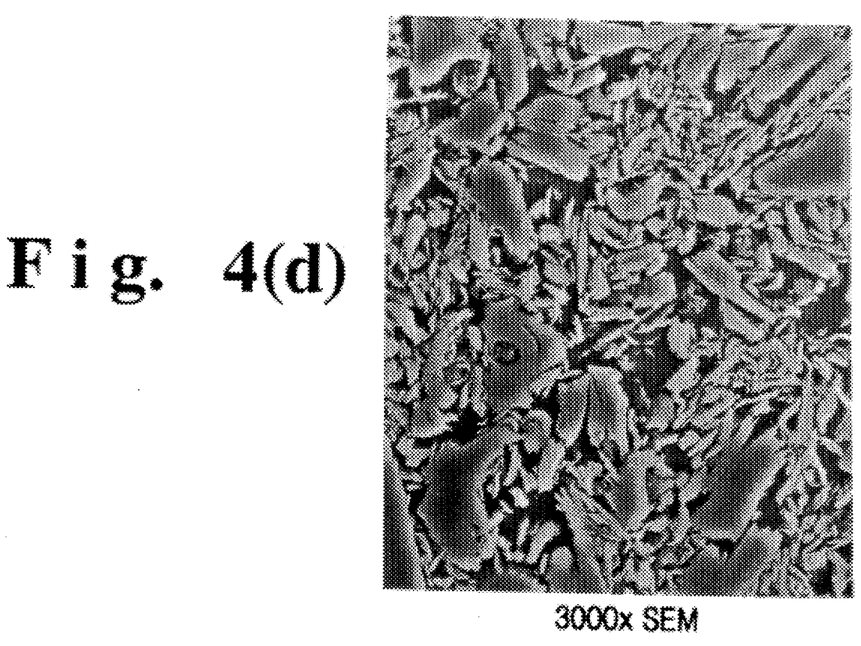

Low internal porosity (herein called "closed porosity") of individual carbon particles is desired in the practice of the present invention. Closed porosity is depicted pictorially in FIG. 3.

The closed porosity of individual carbon particles is determined by experimentally measuring the helium density and x-ray density of the particles and then applying the equation:

$$\% \text{ Closed Porosity} = 100 * [1 - \text{He}/\text{X-Ray}]$$

wherein "He" is the helium density as measured by ASTM-D-2638 and "X-ray" is the x-ray density as measured by ASTM-D-5187 (for crystallite size and interlayer spacing). Scanning electron microscopy can also be used to obtain quantitative data on the closed porosity. The helium density (also called "helium envelope density") of the mass of carbon particles includes both bubble-like pores which are generated within the carbon granule during solidification and the microporosity which is generated during the solid state crystal growth. Both of these types of porosity are inaccessible to helium and contribute to a reduction in the measured helium density.

The closed porosity of individual coke particles is generally very low and in the 1–5% range. Hence, coke is a preferred form of carbon in the present invention. The closed porosity of coke particles is removed by fracture through the bubbles during milling. Generally, the closed porosity of a carbon particle can be reduced by milling to a fine particle size. The nature of the carbon starting materials also has a strong influence on the closed particle porosity. Carbons derived from starting materials which carbonize in the solid state (such as thermoset polymers) have extensive closed porosity (e.g, up to 25%) which is difficult to reduce through size reduction. Hence, carbons of the latter type are not preferred in this invention.

In accordance with the present invention, a carbon starting material is milled to achieve the desired closed porosity in a suitable apparatus (e.g., in a jet mill, ball mill or attrition mill) at room temperature in air or an inert gas.

Open Porosity

Once the individual carbon particle x-ray density and closed porosity have been maximized as indicated above, then the optimum or highest packing density of the agglomerate of carbon particles to be used in an electrode is achieved by controlling (herein called "compacting") the amount of interparticle porosity (herein call "open porosity"). The packing or bulk density of an electrode carbon is controlled by the amount of interparticle porosity. The open porosity is determined by measuring the bulk density and the helium density of the agglomerate of particles and then applying the equation:

% Open Porosity=100 * [1−Bulk/He]

wherein "Bulk" is the bulk density calculated from the weight and dimensions or volume of compacted carbon particles in accordance with ASTM (C559) - 79N and "He" is the helium density as measured by ASTM-D-2638.

The packing density of an agglomerate of particles in carbon starting material is related to both particle morphology (e.g., spherical or needle-like particles) and particle size distribution of the starting material. Particle morphology is controlled by the nature of the carbon starting material and by the processing conditions used to treat the starting material. Starting materials having spherical shaped carbon particles will result in the highest packing densities while needle-like particles will result in the lowest packing densities.

Figure 5:
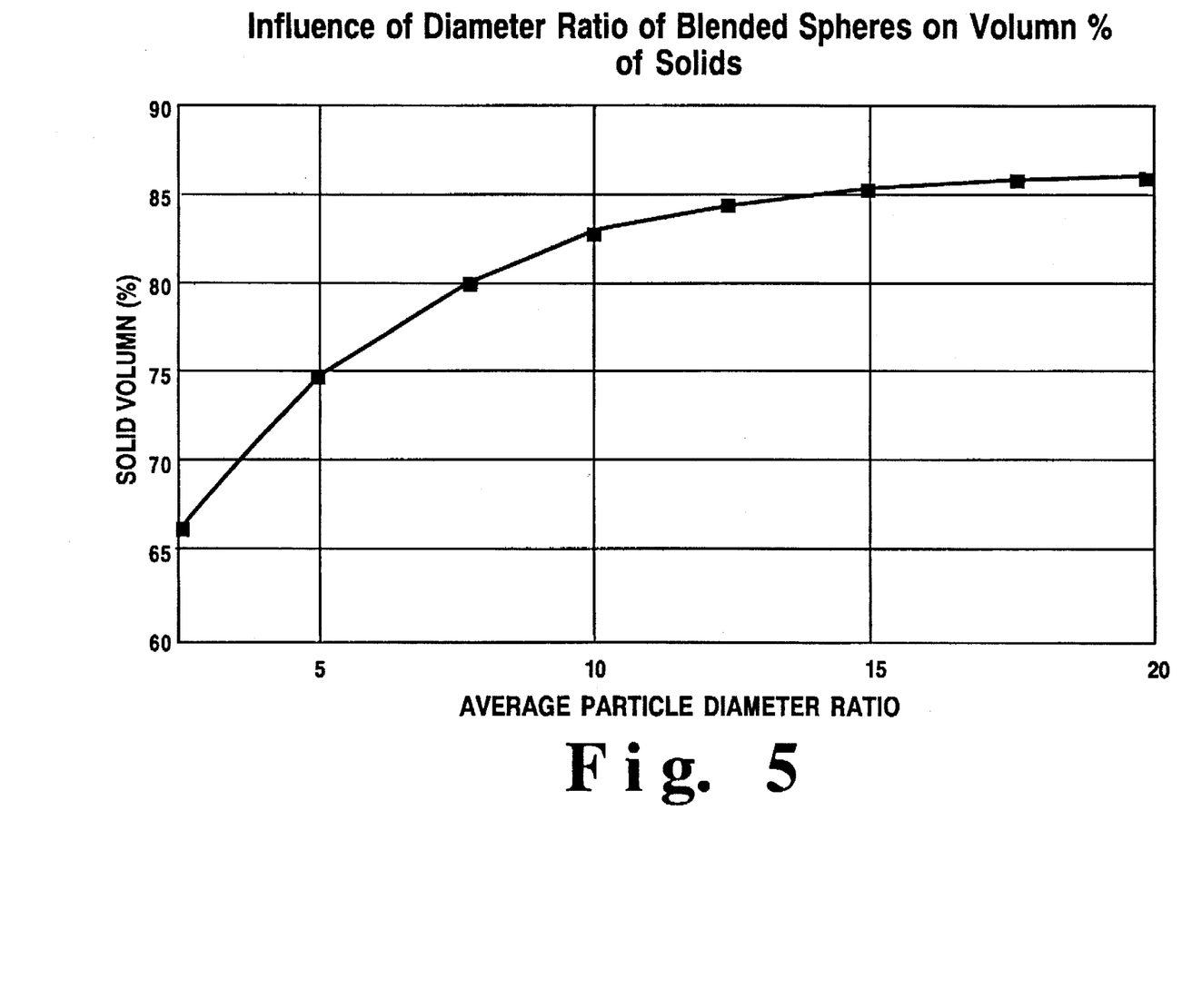
FIG. 5 shows the influence of diameter ratio of blended spheres on volume percentage of solids.

According to packing theory (see FIG. 5), a maximum packing density of intercalating carbons can be achieved using a bimodal size distribution with size ratios of approximately 15/1. This distribution of sizes within each component should be as narrow as possible without overlap. Since large particles, greater than 50 microns in diameter, can impede electrochemical performance of an electrochemical cell, and since milling a carbon below an average diameter of 2 to 3 microns is difficult, diameter size ratios of 5/1 to 10/1 for blended fractions of carbons are most practical for this application. Suitable carbon particles have an average particle size from 2 microns to 40 microns with essentially no particles greater than 50 microns (e.g., less than 15 weight percent—and preferably less than 5 weight percent—of the coke particles are greater than 50 microns).

Graphite powders, because of their "softness" can be compressed to attain significantly higher packing densities than cokes. "Softness" means the ability to be compressed by pressure. Hence, graphite powders are preferred carbon starting materials in the present invention.

Compacted Carbon Electrode

The compacted carbon particles provided by the present invention are used to produce an electrode utilizing any of the components conventionally used to produce carbon electrodes for electrochemical cells. Typically, the graphite particles are used in conjunction with a binder. Suitable binders include polyvinylidene fluoride and ethylene-propylene-diene terpolymers. Suitable other components include electrically conductive carbon. From 3 to 30 weight percent of the binder and from 0 to 10 weight percent (preferably from 2 to 6 weight percent) of the electrically conductive carbon can be used based on the weight of the compacted carbon, binder and any electrically conductive carbon. The binders and electrically conductive carbons used in the present invention are the binders and electrically conductive carbons used in known electrochemical cells having particulate carbon electrodes. The compacted carbon-binder-conductive carbon mixture can be used coated on a metallic substrate (e.g., a metallic foil such as a copper, nickel or stainless steel foil). The above-mentioned components are formed into an electrode by any suitable means (e.g., by casting or hot pressing). The geometric structure of the compacted carbon electrode can be cylindrical, rectangular or any other suitable shape.

Electrochemical Cells

Figure 1:
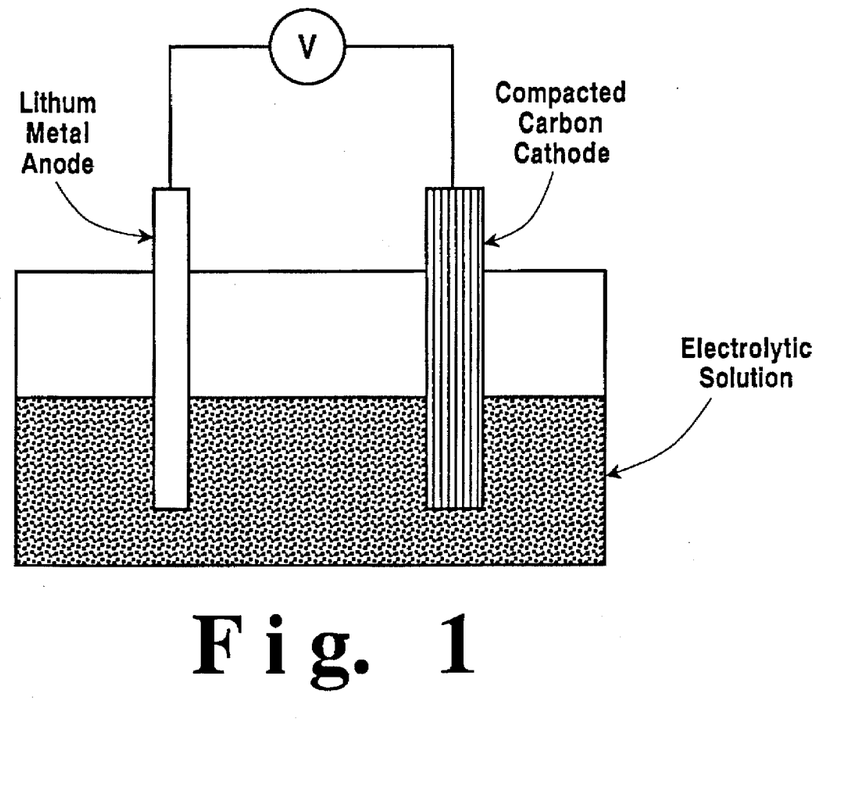
FIG. 1 shows an electrochemical cell in accordance with the present invention wherein the electrode of the present invention is the cathode.
Figure 2:
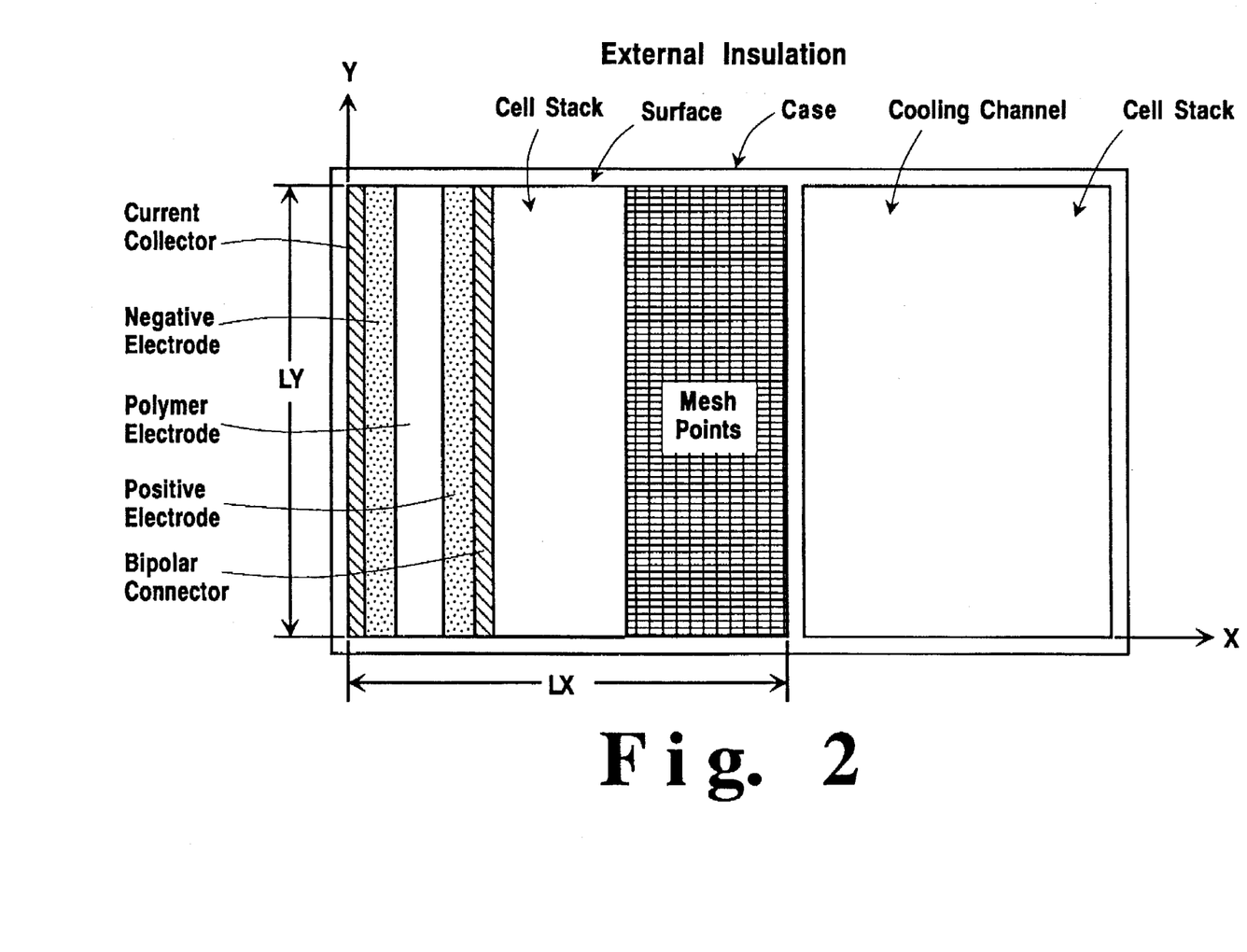
FIG. 2 shows an electrochemical cell of the present invention where the electrode of the present invention is the anode.

The compacted carbon electrodes of the present invention are used in electrochemical cells comprising:

(a) a compacted carbon as described above, (b) a non-aqueous electrolytic solution comprising an organic aprotic solvent and an electrically conductive salt of an alkali metal, and (c) a counterelectrode, Illustrative of such electrochemical cells are the electrochemical cell shown in FIGS. 1 and 2. These electrochemical cells are rechargeable (secondary) electrochemical cells.

The electrodes of this invention contain compacted carbon which reversibly intercalates alkali metals. Various of the materials useful in counterelectrode (e.g. metal oxides such as manganese dioxide) also reversibly intercalate alkali metals (or otherwise reversibly incorporate alkali metals in their crystalline structure such as by van der Waals forces). When such electrodes and counterelectrodes are present in the electrochemical cells, the cells are of the "rocking chair" or "alkali metal ion" variety. Such cells are a preferred embodiment of the present invention.

Non-Aqueous Electrolytic Solutions

In the non-aqueous electrolytic solutions used in the electrochemical cells of the present invention, suitable electrically conductive salts include the alkali metal salts of halides, halates, perhalates, haloaluminates, haloarsenates, halophosphates, haloacetates, phosphates, thiocyanates, sulfides, sulfates, cyanides, picrates, acetylacetonates, fluoroborates, hydrides, borohydrides, and so forth. The electrolyte salt should be compatible with both the cathode-active material, the highly graphitic carbonaceous anode material and the sequestering agent. When the alkali metal is lithium, suitable lithium electrolyte salts include $LiMn_2O_4$, $LiCoO_2$, $LiNO_2$, $LiAsF_6$, $LiPF_6$, $LiClO_4$, $LiBF_4$, $LiB(C_4H_5)_4$, $LiCF_3SO_3$, $LiN_9CF_3SO_2)_2$, $LiSO_3F$, $LiAlCl_4$, LiBr, and mixtures thereof. $LiAsF_6$, $LiMn_2O_4$, $LiCoO_2$ and mixtures thereof are preferred. Preferably, a 0.5 to 3.0 molar solution of the salt is employed.

In the non-aqueous electrolytic solutions used in the electrochemical cells of the present invention, suitable organic aprotic solvents include solid polymer electrolytes such as polyethylene oxide and polyacrylonitrile; Lewis bases such as the tertiary amines; amides and substituted amides such as formamide; nitriles such as acetonitrile, propionitrile and benzonitrile; open chain and cyclic esters such an alkylene carbonates (e.g., as propylene carbonate) and alkyl carbonates (e.g., diethyl carbonate), alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran. Such non-aqueous electrolytic solutions can also contain the optional components such as sequestering agents (e.g., glyme and crown ethers). Preferred non-aqueous electrolytic solutions used in the present invention comprise a lithium salt and at least one alkylene or dialkyl carbonate or solid polymer electrolyte solvent.

Counterelectrodes

The counterelectrodes in the electrochemical cells of the present invention are selected so that there is a potential difference between the counterelectrode and the above-described electrode containing the compacted carbon. The electrode having the higher potential is the cathode.

Suitable counterelectrodes can be made from an electrically active material such as metal-chalcogen combinations (particularly transition metal-chalcogen combinations such as metal oxides), metal halides, and the like. Such chalcogens to include the chemically-related elements from Group VI of the periodic table, namely oxygen, sulfur, selenium, tellurium and polonium. Preferred transition metals include manganese, nickel, iron, chromium, titanium, vanadium, molybdenum and cobalt. Preferred electrically active materials for the counterelectrode include molybdenum sulfides, vanadium oxides and manganese oxides such as $MoS_2$, $V_6O_{13}$, $CoO_2$ and $MnO_2$. Preferably the counterelectrode is capable of intercalating or otherwise incorporating lithium into its crystalline lattice.

The counterelectrode may include the above-described electrically-active material in particulate form with a suitable inner polymeric binder, such as ethylene-propylene-diene terpolymers ("EPDT"), a polyfluorinated hydrocarbon such as polytetrafluorethylene ("PTFE"), or polyethylene oxide ("PEO"). Such binders are those used in known counterelectrodes. Preferably, about 4% by weight or less of the polymer to counterelectrode material is used. The counterelectrode can also contain additives such as electrically conductive carbon.

Cell Fabrication

In assembling the electrochemical cells of the present invention the counterelectrode can be fabricated by depositing a slurry of the cathode material, an electrically conductive inert material (as described above for the counterelectrode), a binder and a fugitive liquid carrier (such as cyclohexane) on a cathode current collector and then evaporating the carrier to leave a coherent mass in electrical contact with the current collector.

Likewise, the electrode containing the compacted carbon in particulate form can be mixed with a suitable inert polymeric binder. Expansion and contraction of the electrode during cell cycling can cause the compacted carbon particles to lose electrically conductive contact with one another. Conductivity can be similarly enhanced by adding an electrically-conductive material, such as carbon black, to the electrode. The electrode can be fabricated by depositing a slurry of the compacted carbon particles, an electrically-conductive inert material, a binder and a fugitive liquid carrier such as cyclohexane on an electrically-conductive anode support and then evaporating the carrier to leave a coherent mass in electrical contact with the support.

The counterelectrode assembly can then be combined with the compacted carbon electrode assembly and, if desired, a porous polymeric electrode separator can be sandwiched therebetween.

The electrodes and counterelectrodes in the cells of the present invention can be intercalated with (or otherwise incorporated with) an alkali metal by the means known in the art (e.g., by the means disclosed in U.S. Pat. No. 5,028,500 and European Patent Application 0 474 183 A2—the disclosures of which are incorporated herein by reference). By way of illustration, if the cathode-active material is non-lithiated or insufficiently lithiated, a sheet of lithium metal foil can be sandwiched between either the anode assembly or the cathode assembly and a porous separator. A sheet of lithium foil can be placed between the anode and the separator so that the surface of the sheet is coextensive with the surface of the anode and the thickness of the sheet is chosen so that the correct amount of lithium is present for intercalation into the anode. The layered assembly can then be wound around the metallic center post to form a spiral assembly that is then placed into the cell container to which is added the electrolyte solution into which the sequestering agent has been dissolved. The cell container can then be covered with the cell cap.

Electrode conductors for attachment to the electrode and counterelectrode are used in the electrochemical cells of the present invention. Among the satisfactory electrode conductors are tungsten, aluminum, stainless steel, steel, graphite, lead oxide, platinum, copper, nickel, silver, iron and brass.

Improvements

The use of the compacted carbon of the present invention results in electrochemical cells having improved capacities on a carbon volume basis.

The decomposition of the organic aprotic solvent during discharge of the electrochemical cells of the present invention can be reduced by the means described and claimed in the commonly assigned U.S. patent application Ser. No. 08/654,660 filed concurrently herewith in the names of Irwin Charles Lewis and Ronald Alfred Greinke, entitled "Chemically Modified Graphite For Electrochemical Cells".

The capacity of the electrochemical cells of the present invention wherein the electrodes contain coke can be further improved by employing the heteroatom incorporated coke described and claimed in the commonly assigned United States patent application fled concurrently herewith in the names of Irwin Charles Lewis and Ronald Alfred Greinke, entitled "Heteroatom Incorporated Coke for Electrochemical Cells" (Attorney reference D-30003).

The disclosures of said concurrently filed United States patent applications are incorporated herein by reference.

The following Examples illustrate the present invention:

EXAMPLE 1

Improvement in X-Ray Density

The skeletal density or x-ray density of a carbon is related to both precursor and heat-treatment temperature. Well graphitizing materials, such as cokes, will achieve a greater skeletal density than poorly graphitizing materials, such as thermoset resins, when heat treated to comparable temperatures.

The skeletal density or x-ray density of any carbon can be increased by raising the heat-treatment until full graphitization is complete and the maximum of 2.265 grams per cubic centimeter is achieved. Since the change of heat-treatment temperature also alters the carbon structure and the intercalation characteristic of the resulting carbon, this effect must be considered in processing the final carbon.

Once an appropriate carbon has been selected, it should be heat treated to successively higher temperatures to improve the x-ray density and the effects on lithium intercalation determined. If the measured intercalation capacity of the carbon (as measured by percent $LiC_6$ or mAh/gm) does not decrease by heat treating to a higher temperature, then the capacity on a volume basis will be increased.

The graphite interlayer spacing decreases with heat treatment temperature for a well-graphitizing starting material (e.g. acenaphthylene) and a poorly graphitizing starting material (e.g. bifluorenyl) (see W. Ruland, Carbon, Vol. 2, 365, 1965). Thus, the bifluorenyl is converted to a coke by heat treatment to 800° C., the interlayer spacing is about 3.75 Å. By heat treating to 1500° C., the interlayer spacing is decreased to 3.40 Å; therefore, the x-ray density would be increased from 2.02 to 2.23 or 10% in accordance with the calculations:

$$2.265 \times \frac{3.354}{3.400} = 2.23$$

$$2.265 \times \frac{3.354}{3.75} = 2.02$$

For the well-graphitizing material, the x-ray interlayer spacing decreases from about 3.60 to about 3.40 Angstroms in the same temperature range resulting in a density gain of 6%.

If the intercalation capacity for the heat-treated cokes remains constant on a mAh/g of carbon basis, then it would be desirable to heat treat to the highest temperature in order to achieve maximum density and highest capacity per unit volume. Since carbons heat treated at 2000° C. substantially lose intercalation capacity (*Lithium Batteries*, by J. K. Dahn, Industrial Chemistry Library, Volume 5, page 34, Elsevier, Amsterdam-London-New York-Tokyo, 1994), the heat treatment should be maintained below 2000° C. to achieve the highest density.

EXAMPLE 2

Improvement of Closed Porosity

A carbon powder prepared by heat treatment of polyacrylonitrile powder to 1200° C. in an inert atmosphere was tested in an electrochemical cell against a lithium metal counterelectrode. This powdered carbon is referred to as "PAN carbon". The test cell is shown in FIG. 1. The cells for testing were constructed using metallic lithium foil as the anode and the PAN carbon under test as the cathode. The electrolyte consisted of 1 Molar $LiPF_6$ in 50% ethylene carbonate and 50% diethyl carbonate as solvent. The PAN carbon was cast into a film on to a nickel foil using a slurry of the carbon with 5 wt % of a polyvinylidene flouride (PVDF) binder and 4 wt % electrically conducting carbon (commercially available as "Super S") in cyclohexane. The film coating was adjusted to give 3–8 mg/cm$^2$ of dried electrode coating. The coating was dried by heating to 200° C. for 2 hours and then kept at 100° C. prior to use. The total electrode area was 5 cm$^2$. The cells were cycled at constant current between the potential limits of +2.5 volts to 0.00 volt.

The helium density of the PAN carbon was measured as 1.638 grams per cubic centimeter and the X-ray interlayer spacing was 3.44 Å. The closed porosity was calculated as equal to 26%. The electrochemical test results showed that the capacity was 44% of $LiC_6$ after two cycles which corresponds to an electrochemical capacity of 164 mAh/g of carbon. Since the helium density of the PAN carbon is 1.63 grams per cubic centimeter, the volume capacity of the PAN carbon was 268 mAh/cc of carbon.

As a comparison, a compacted coke was prepared by heat treating a coal tar pitch to 1200° C. to produce a compacted coke with a helium density of 2.09 grams per cubic centimeter and with only 5% closed porosity. When this cell was tested as a cathode against a lithium anode, it gave a capacity of 41% on the initial cycle which corresponds to 152 mAh/gm. This compacted coke, therefore, had about a 7% lower capacity than the PAN carbon on a weight basis. However, because of the high helium density and the low porosity, the capacity of the compacted coke on a volume basis was 318 mAh/cc which is 18.6% greater than the PAN carbon. The compacted coke material would, therefore, be preferred for any volume sensitive application in an electrochemical cell.

EXAMPLE 3

Improvement in Open Porosity

The open porosity of carbon starting materials was decreased as follows:

Pellets were prepared using approximately 2 to 4 percent by weight of an ethylene-propylene-diene terpolymer ("EPDT") binder to measure the optimum packing densities for a number of carbon starting materials. The EPDT was dissolved in toluene and the solution was then mixed with the carbon starting material. After evaporation of the toluene, the carbon starting material was found to be coated uniformly with a small amount of the adhesive. The specific procedure used to decrease the porosity of the carbon starting materials is as follows:

(a) prepare a 2% by weight solution of EPDT in toluene, (b) add 200 parts per hundred of solution to the carbon starting material (equivalent to 4 parts per hundred maximum of EPDT), (c) evaporate the toluene on a hot plate; stir the mixture occasionally, (d) crush the dried carbon with adhesive through a 40 mesh screen, (e) add crushed powder containing a light coating of adhesive to the die, and (f) press using about 5000 pounds per square inch at ambient temperatures.

FIG. 4 shows the packing and interparticle porosity achieved with a petroleum coke using the EPDT binder. In FIG. 4, "SEM" denotes "Scanning Electron Microscopy". The amount of closed porosity measured is about 3.6% while the amount of open porosity is about 50.4%. The greatest amount of improvement in capacity of this carbon starting material on a per volume basis can be attained by reducing the amount of open porosity.

Figure 6:
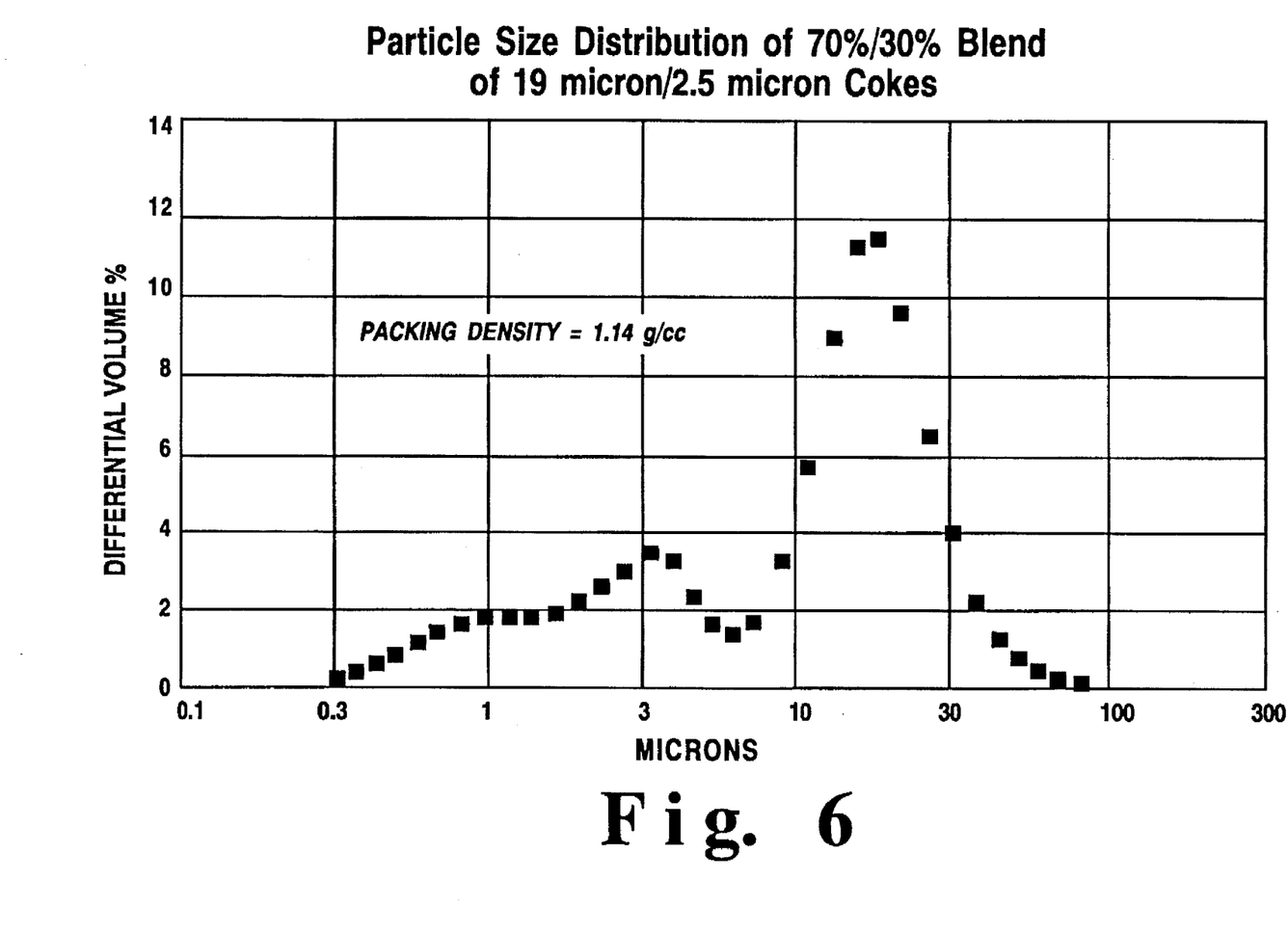
FIG. 6 shows the particle size distribution of 70%/30% blend of 19 micron/2.5 micron cokes.

The optimization of open porosity is illustrated for pellets made by blending two different sized fractions of a petroleum coke (one fraction having an average particle size of 2.5 microns and the other fraction having an average particle size of 19 microns). As is illustrated in Table I, the densities of the blends of the two different size coke particles are higher than for the individual components. The particle-size distribution for a 70/30 blend of the two cokes that resulted in a low porosity is shown in FIG. 6. Additional porosity reductions could be realized by obtaining narrower size fractions for the components in the blended cokes and by using a coke that had a more spherical particle morphology.

Table II shows packing density data for two graphite powders measured using the EPDT binder technique described above. As can be seen by comparing the bulk densities and open porosities in Table II, the achievable bulk densities of unblended graphite particles are about 40% higher than for the best blended cokes and the open porosities of the graphite are reduced almost 50%. This result is due to the greater softness of the graphite powder. The open porosity of the graphite would be reduced further by blending fractions as shown for cokes in Table I.

TABLE I

Densities and Porosities of Blended Coke Fractions

| Wt. % Fraction (1) (19 microns) | Wt. % Fraction (2) (2.5 microns) | Bulk Density g/cc | % Open Porosity |
| --- | --- | --- | --- |
| 100 | 0 | 1.06 | 50 |
| 90 | 10 | 1.11 | 47 |
| 80 | 20 | 1.15 | 45.1 |
| 70 | 30 | 1.14 | 45.3 |
| 0 | 100 | 0.91 | 56 |

TABLE II

Packing (Bulk) Densities of Graphites*

| Graphite | Particle Size (microns) | Bulk Density g/cc | % Open Porosity |
| --- | --- | --- | --- |
| Natural Graphite | 34 | 1.62 | 26 |
| Synthetic Graphite | 18 | 1.50 | 33 |

*Measured using EPDT binder

EXAMPLE 4

The configuration of the electrochemical cells of this invention can incorporate the features of the cell shown in "Heat Transfer Phenomena in Lithium/Polymer-Electrolyte Batteries for Electric Vehicle Application", Yufei Chen and James W. Evans, *J. Electrochem. Soc.*, Vol. 140, No. 7, July 1993, 1833–1838. This cell is shown in FIG. 2 herein. As shown in FIG. 2, a lithium/polymer cell consists of a lithium negative electrode (consisting of lithium, compacted carbon and a polyvinylidene fluoride binder), a solid polymer electrolyte (polyethylene oxide containing a lithium salt) and composite positive electrode containing $MnO_2$ and a binder as well as bipolar connector/current collectors. A battery/stack is composed of many parallel-connected units, and each unit is composed of many series-connected, bipolar cells. This design is adopted in the Harwell prototype and is expected to exhibit high specific energy. (See A. Hooper, in *Solid-State Batteries*, C.A.C. Sequeira and A. Hooper, Editors, p. 399, NATO ASI Series, Marthus Nijhoff, Amsterdam (1985) relating to the Hartwell Prototype.

What is claimed is:

1. Compacted carbon that is useful in the electrode of an alkali metal/carbon electrochemical cell of improved capacity selected from the group consisting of:

(a) coke having the following properties:
      (i) an x-ray density of at least 2.00 grams per cubic centimeter,
      (ii) a closed porosity of no greater than 5%, and
      (iii) an open porosity of no greater than 47%; and
   (b) graphite having the following properties:
      (i) an x-ray density of at least 2.20 grams per cubic centimeter,
      (ii) a closed porosity of no greater than 5%, and
      (iii) an open porosity of no greater than 25%.

2. Compacted carbon in the form of coke as claimed in claim 1.

3. Compacted carbon in the form of graphite as claimed in claim 1.

4. Compacted carbon as claimed in claim 1 comprising compacted particles wherein the particles have an average size from 2 microns to 40 microns and are essentially free of particles having a particle size greater than 50 microns.

5. An electrode of an alkali metal/carbon electrochemical cell of improved capacity comprising:

I. compacted carbon selected from the group consisting of:
      (a) coke having the following properties:
         (i) an x-ray density of at least 2.00 grams per cubic centimeters,
         (ii) a closed porosity of no greater than 5%, and
         (iii) an open porosity of no greater than 47%; and
      (b) graphite having the following properties:
         (i) an x-ray density of at least 2.20 grams per cubic centimeter,
         (ii) a closed porosity of no greater than 5%, and
         (iii) an open porosity of no greater than 25%; and
   II. a binder.

6. An electrode as claimed in claim 5 wherein the compacted carbon is coke a defined in claim 5.

7. An electrode as claimed in claim 5 wherein the compacted carbon is graphite as defined in claim 5.

8. An electrode as claimed in claim 5 wherein the compacted carbon comprises particles that have an average size from 2 microns to 40 microns and are essentially free of particles having a particle size greater than 50 microns.

9. An electrode as claimed in claim 5 wherein the compacted carbon and the binder are coated on a metallic foil substrate.

10. An electrode as claimed in claim 5 wherein the binder is polyvinylidene fluoride or an ethylene propylene-diene terpolymer.

11. An electrode as claimed in claim 5 which also contains electrically conductive carbon.

12. An alkali metal/carbon electrochemical cell comprising:

I. an electrode comprising a binder and a compacted carbon selected from the group consisting of:
      (a) coke having the following properties:
         (i) an x-ray density of at least 2.00 grams per cubic centimeter,
         (ii) a closed porosity of no greater than 5%, and
         (iii) an open porosity of no greater than 47%; and
      (b) graphite having the following properties:
         (i) an x-ray density of at least 2.20 grams per cubic centimeter,
         (ii) a closed porosity of no greater than 5%, and
         (iii) an open porosity of no greater than 25%,
   II. a non-aqueous electrolytic solution comprising an organic aprotic solvent and an electrolytically conductive salt of an alkali metal; and
   III. a counterelectrode.

13. An electrochemical cell as claimed in claim 12 wherein the compacted carbon comprises particles having an average size from 2 microns to 40 microns and are essentially free of particles having a particle size greater than 50 microns.

14. An electrochemical cell as claimed in claim 12 wherein the compacted carbon is coke as defined in claim 12.

15. An electrochemical cell as defined in claim 12 wherein the compacted carbon is graphite as defined in claim 12.

16. An electrochemical cell as defined in claim 12 wherein the binder in the electrode is polyvinylidene chloride or an ethylene-propylene-diene terpolymer and wherein the electrode also contains electrically conductive carbon.

17. An electrochemical cell as claimed in claim 12 wherein the electrode is the anode, the counterelectrode is the cathode and the counterelectrode comprises $MoS_2$, $V_6O_{13}$, $CoO_2$ or $MnO_2$ and a binder.

18. An electrochemical cell as claimed in claim 12 wherein the organic aprotic solvent is at least one alkyl or alkylene carbonate or a solid polymer electrolyte and the electrolytically conductive salt is $LiAsF_6$, $LiMn_2O_4$ or $LiCoO_2$.

19. An electrochemical cell as claimed in claim 12 wherein the organic aprotic solvent is polyethylene oxide or polyacrylonitrile and the electrolytically conductive salt is $LiAsF_6$, $LiMn_2O_4$ or $LiCoO_2$.

20. An electrochemical cell as claimed in claim 12 wherein the electrode is an anode containing reversibly intercalated lithium in the compacted carbon and the counterelectrode is a cathode comprising a metal oxide having lithium reversibly incorporated therein.

* * * * *